United States Patent
Kageyama et al.

(10) Patent No.: US 7,414,345 B2
(45) Date of Patent: Aug. 19, 2008

(54) COMMUTATOR AND ARMATURE

(75) Inventors: Ryohei Kageyama, Hamamatsu (JP); Nobuo Kasao, Kosai (JP); Toshiyuki Osawa, Hamamatsu (JP)

(73) Assignee: Asmo Co., Ltd., Kosai-shi (JP)

( * ) Notice: Subject to any disclaimer, the term of this patent is extended or adjusted under 35 U.S.C. 154(b) by 22 days.

(21) Appl. No.: 11/489,283

(22) Filed: Jul. 19, 2006

(65) Prior Publication Data
US 2007/0096582 A1 May 3, 2007

(30) Foreign Application Priority Data
Jul. 19, 2005 (JP) .............................. 2005-209130

(51) Int. Cl.
*H02K 13/04* (2006.01)
*H01R 39/04* (2006.01)

(52) U.S. Cl. .................. 310/234; 310/233; 310/204

(58) Field of Classification Search ................ 310/204, 310/233, 234, 197, 200
See application file for complete search history.

(56) References Cited

U.S. PATENT DOCUMENTS

| | | | | |
|---|---|---|---|---|
| 4,854,438 A | * | 8/1989 | Weissenberger et al. | 192/107 R |
| 6,181,046 B1 | * | 1/2001 | Daikoku et al. | 310/236 |
| 6,236,137 B1 | * | 5/2001 | Tanaka et al. | 310/233 |
| 6,246,141 B1 | * | 6/2001 | Bailey | 310/211 |
| 6,727,627 B1 | * | 4/2004 | Sasaki et al. | 310/211 |
| 2004/0095036 A1 | * | 5/2004 | Yamamoto et al. | 310/233 |
| 2005/0189841 A1 | * | 9/2005 | Potocnik | 310/236 |

FOREIGN PATENT DOCUMENTS

| | | |
|---|---|---|
| JP | 2000-134873 | 5/2000 |
| JP | 2005137193 A * | 5/2005 |

* cited by examiner

*Primary Examiner*—Burton Mullins
(74) *Attorney, Agent, or Firm*—Fulwider Patton LLP

(57) ABSTRACT

A commutator including a commutator main body having a plurality of commutator pieces and a short-circuit member having a short-circuit conductor for short-circuiting commutator pieces. The short-circuit conductor includes superimposed first and second short-circuit member formation groups. The first short-circuit member formation group is thinner than the second short-circuit member formation group. The first and second short-circuit member formation groups are fixed to each other by crimping projections, which are formed on the second short-circuit member formation group through punching, in a state inserted through holes, which are formed in the second short-circuit member formation group.

13 Claims, 5 Drawing Sheets

US 7,414,345 B2

COMMUTATOR AND ARMATURE

RELATED APPLICATIONS

This application claims the benefit of foreign priority from Japanese Patent Application No. 2005-209130, filed Jul. 19, 2005.

BACKGROUND OF THE INVENTION

The present invention relates to a commutator in which predetermined commutator pieces are short-circuited, and to an armature.

In the prior art, an armature for a motor having power feeding brushes may include a commutator in which a plurality of commutator pieces are short-circuited. Such a motor allows electric current to flow even to commutator pieces that are not in contact with power feeding brushes by short-circuiting predetermined commutator pieces. This enables a reduction in the number of power feeding brushes required in the motor.

In one example, in a rotating armature described in Japanese Laid-Open Patent Publication No. 2000-134873, a plurality of short-circuit conductors for short-circuiting commutator pieces of a commutator are arranged to overlap one another at an axial end portion of the commutator.

However, when the short-circuit conductors are arranged to overlap one another at the axial end portion of the commutator, the overlapping short-circuit conductors increase the length of the commutator in the axial direction, which in turn, increases the length of the armature in the axial direction. Further, the overlapping short-circuit conductors may rub against one another. This may rub off the coating of the short-circuit conductors. In such a case, the short-circuit conductors may be electrically connected (layer short). This may lower the manufacturing yield of the armature or cause erroneous operations of the armature and may eventually lower the reliability of the armature.

SUMMARY OF THE INVENTION

It is an object of the present invention to provide a commutator and an armature that may be shortened in the axial direction and have high reliability.

To achieve the above object, one aspect of the present invention provides a commutator including a commutator main body and a short-circuit member. The commutator main body includes a cylindrical main body insulator and a plurality of commutator pieces held on an outer circumferential surface of the main body insulator so that the commutator pieces are arranged in a circumferential direction of the main body insulator. The short-circuit member is attached to the commutator main body and includes a short-circuit conductor that short-circuits the commutator pieces. The short-circuit conductor includes first and second short-circuit member formation groups arranged with one superimposed over the other. Each of the short-circuit member formation groups has a plurality of outer terminals arranged about an axis of the commutator, a plurality of inner terminals arranged about the axis of the commutator radially inward from the outer terminals, and a plurality of linking portions linking each of the outer terminals to one of the inner terminals. The linking portions in at least one of the first and second short-circuit member formation groups links the outer terminals and the inner terminals that are separated from each other by a predetermined angle in the circumferential direction. Each of the outer terminals in the first short-circuit member formation group contacts one of the outer terminals in the second short-circuit member formation group, and each of the inner terminals in the first short-circuit member formation group contacts one of the inner terminals in the second short-circuit member formation group. The linking portions in the first short-circuit member formation group are maintained in non-contact with the linking portions in the second short-circuit member formation groups. The first short-circuit member formation group is thinner than the second short-circuit member formation group. The second short-circuit member formation group has a plurality of projections formed through punching, and the first short-circuit member formation group has a plurality of holes respectively corresponding to the projections. The first short-circuit member formation group and the second short-circuit member formation group are fixed to each other by crimping the projections in a state inserted through the corresponding holes.

A further aspect of the present invention provides an armature including the above commutator. The armature includes a rotation shaft extending through the axis of the commutator, and an armature core fixed to the rotation shaft so as to be axially aligned with the commutator. The armature core has a plurality of teeth. A plurality of coils are wound around the teeth.

BRIEF DESCRIPTION OF THE DRAWINGS

The features of the present invention believed to be novel will become apparent from the attached claims. The invention, together with objects and advantages thereof, may best be understood by reference to the following description of the presently present embodiments together with the accompanying drawings in which:

DETAILED DESCRIPTION OF THE PRESENT EMBODIMENTS

Figure 1:
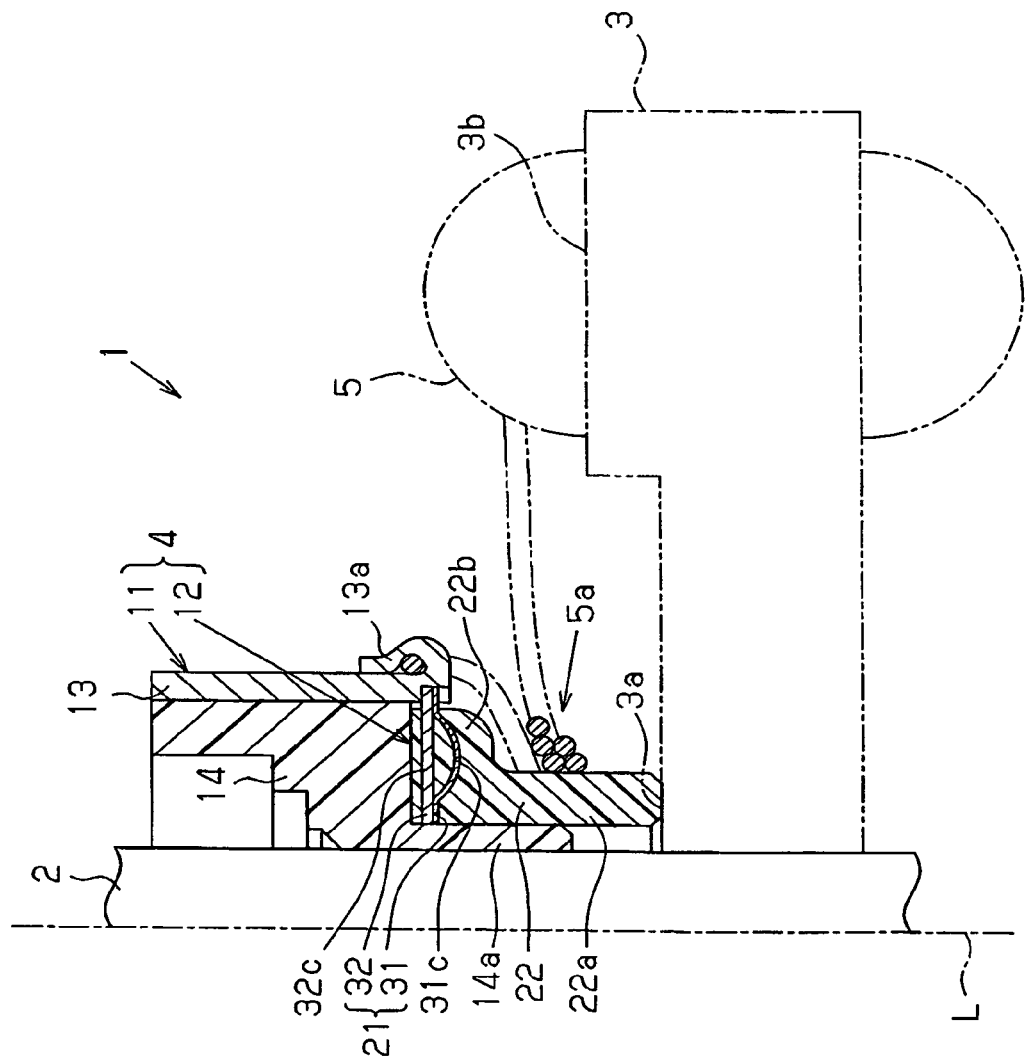
FIG. 1 is a schematic cross-sectional view of an armature according to one embodiment of the present invention.

A present embodiment of the present invention will now be described with reference to FIGS. 1 to 7B. A motor includes a stator (not shown) and an armature 1, which is shown in FIG. 1. The stator has a plurality of permanent magnets that are arranged in the circumferential direction around a rotation axis L of the motor. FIG. 1 only shows one side of the armature 1 with respect to its axis, or with respect to the rotation axis L of the motor.

The armature 1 includes a metal rotation shaft 2, an armature core 3 fixed to the rotation shaft 2, a commutator 4 fixed to the rotation shaft 2, and a plurality of coils 5. The rotation shaft 2 is rotatably supported by the stator. The armature core 3 is surrounded by the permanent magnets of the stator.

The armature core 3 has a tubular portion 3a, through which the rotation shaft 2 is inserted, and a plurality of teeth 3b (only one is shown in FIG. 1), which extend radially outward from the tubular portion 3a. The coils 5 are respectively wound around the teeth 3b.

The commutator 4 includes a commutator main body 11 and a short-circuit member 12, which is arranged at an axial end portion of the commutator main body 11. The commutator main body 11 includes a plurality of commutator pieces 13 that are arranged in the circumferential direction. In the present embodiment, the commutator main body 11 includes twenty-four commutator pieces 13 arranged in 15-degree intervals. The commutator main body 11 further includes a generally cylindrical main body insulator 14, which holds the radially inner side of the commutator pieces 13. More specifically, the commutator pieces 13 are fixed on the outer circumferential surface of the main body insulator 11 in a state spaced from one another in the circumferential direction so as to form a cylindrical shape as a whole. Anode and cathode power feeding brushes (not shown) are pressed against the commutator pieces 13 in a slidable manner from the radially outer side of the commutator 4.

One end (lower ends in FIG. 1) of each commutator piece 13 projects axially from the main body insulator 14 and is bent radially outward to form a wire connection portion 13a for hooking a coil 5. The main body insulator 14 is made of a thermosetting resin (a phenol resin in the present embodiment). A cylindrical portion 14a extending in the axial direction is formed at the center of one end surface of the main body insulator 14. The inner diameter of the cylindrical portion 14a is equal to the inner diameter of the main body insulator 14. The inner diameter of the main body insulator 14 is set to enable the rotation shaft 2 to be pressed-fitted into the main body insulator 14.

The short-circuit member 12 includes a short-circuit conductor 21 and a short-circuit insulator 22. The short-circuit conductor 21 short-circuits commutator pieces 13 that are arranged at predetermined angular intervals (120 degrees in the present embodiment). The short-circuit insulator 22 holds the short-circuit conductor 21 in a state embedded in the short-circuit insulator 22.

Figure 2:
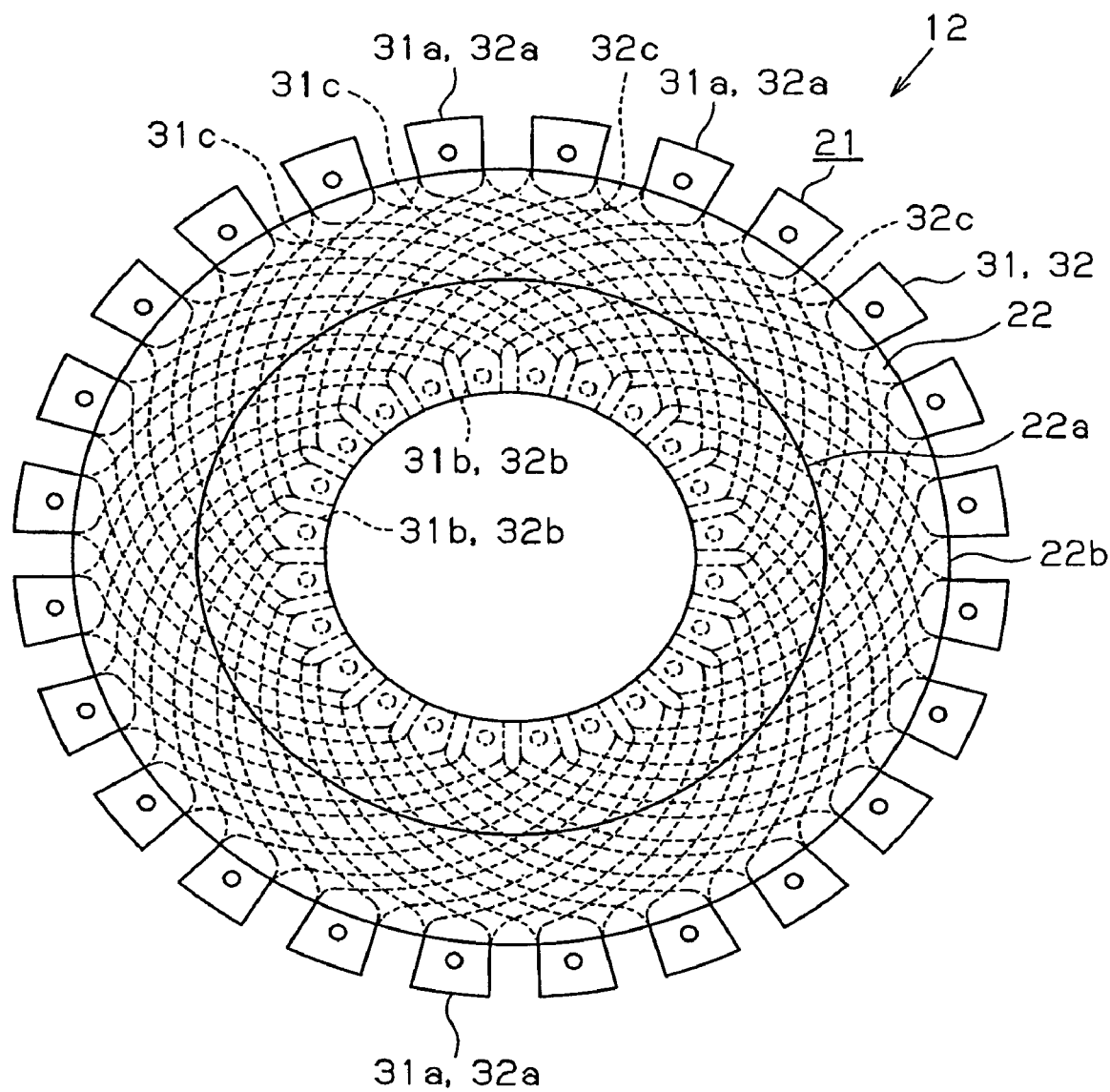
FIG. 2 is a plan view showing a short-circuit member included in the armature of FIG. 1.

The short-circuit conductor 21 includes two superimposed short-circuit member formation groups 31 and 32. In FIG. 1, the first short-circuit member formation group 31 is arranged under the second short-circuit member formation group 32. As shown in FIG. 2, the short-circuit member formation groups 31 and 32 include a plurality of outer terminals 31a and 32a, a plurality of inner terminals 31b and 32b, and a plurality of linking portions 31c and 32c. The outer terminals 31a and 32a are arranged in the circumferential direction of the rotation shaft 2. The inner terminals 31b and 32b are arranged in the circumferential direction of the rotation shaft 2 inward from the outer terminals 31a and 32a. The linking portions 31c and 32c link the outer terminals 31a and 32a and the inner terminals 31b and 32b. The short-circuit member formation groups 31 and 32 are formed as layers respectively arranged along two substantially parallel flat planes. Thus, the short-circuit member formation group 31 never intersects the other short-circuit member formation group 32. In the present embodiment, the short-circuit member formation group 31 includes twenty-four outer terminals 31a, twenty-four inner terminals 31b, and twenty-four linking portions 31c, and the short-circuit member formation group 32 includes twenty-four outer terminals 32a, twenty-four inner terminals 32b, and twenty-four linking portions 32c.

Figure 3:
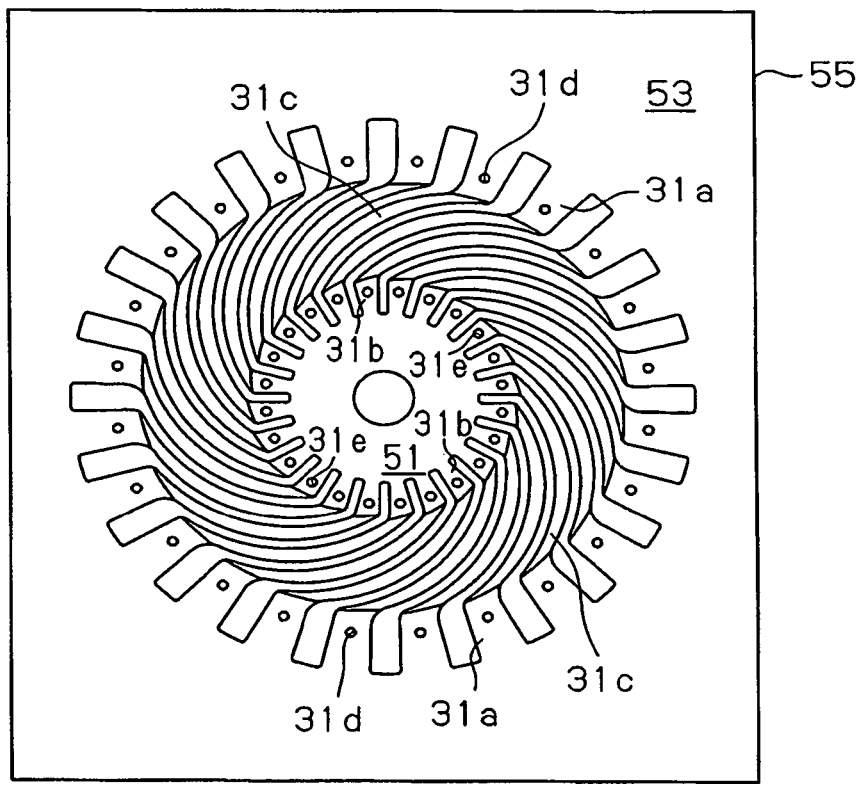
FIG. 3 is a plan view illustrating a method for manufacturing the armature of FIG. 1.
Figure 4:
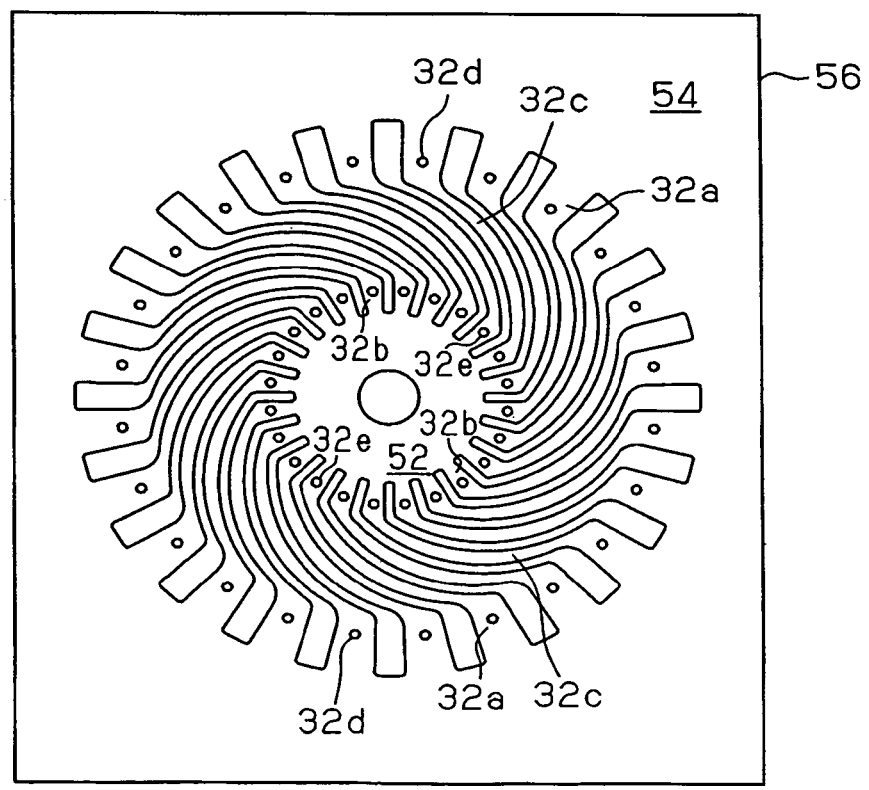
FIG. 4 is a plan view illustrating the method for manufacturing the armature of FIG. 1.

The linking portions 31c and 32c in the short-circuit member formation groups 31 and 32 link the corresponding outer terminals 31a and 32a and the corresponding inner terminals 31b and 32b at positions separated from each other by a predetermined angle (60 degrees corresponding to four terminals in the present embodiment). As shown in FIG. 3, each linking portion 31c in the lower first short-circuit member formation group 31 links one of the outer terminals 31a to one of the inner terminals 31b, which is located at a position separated from that outer terminal 31a by the predetermined angle in the counterclockwise direction. As shown in FIG. 4, each linking portion 32c in the upper second short-circuit member formation group 32 links one of the outer terminals 32a to one of the inner terminals 32b, which is located at a position separated from that outer terminal 32a by the predetermined angle in the clockwise direction. Further, the linking portions 31c and 32c in the present embodiment extends along an involute curve.

The first short-circuit member formation group 31 is thinner than the second short-circuit member formation group 32. Further, the first short-circuit member formation group 31 is formed from a material having a smaller electric resistivity than that of the second short-circuit member formation group 32. In the present embodiment, the first short-circuit member formation group 31 is formed from a copper material and the second short-circuit member formation group 32 is formed from a brass material. In the short-circuit member formation groups 31 and 32, the different parts (the outer terminals 31a and 32a, the inner terminals 31b and 32b, and the linking portions 31c and 32c) each have a constant thickness.

The linking portions 31c in the first short-circuit member formation group 31 are curved toward one side in the axial direction (the lower side in FIG. 1) with respect to the outer terminals 31a and the inner terminals 31b. More specifically, the linking portions 31c are curved away from the second short-circuit member formation group 32. To ease of visual understanding, FIG. 1 shows cross-sections taken along the linking portions 31c and 32c. Further, the linking portions 32c in the second short-circuit member formation group 32 lie along the same plane as the outer terminals 32a and the inner terminals 32b. When the short-circuit member formation groups 31 and 32 are superimposed, each outer terminal 31a comes in contact with one of the outer terminals 32a in the superimposing direction of the short-circuit member formation groups 31 and 32 and each inner terminal 31b comes in contact with one of the inner terminals 32b in the superimposing direction. However, the linking portions 31c and 32c do not come in contact with each other.

The short-circuit member formation groups 31 and 32 are crimped and fixed to each other. In detail, the outer terminals 31a and the inner terminals 31b in the first short-circuit member formation group 31 have holes 31d and 31e (refer to FIG. 6A). A conical inclined surface T is formed at the opening of each of the holes 31d and 31e in the side opposite to the second short-circuit member formation group 32. The inclined surface T is formed in a manner that the diameter of the hole enlarges at outer sides. The outer terminals 32a and the inner terminals 32b in the second short-circuit member formation group 32 are formed to have projections 32d and 32e (refer to FIG. 6A). The projections 32d and 32e, prior to the crimping, have a height that is high enough to reach at least the inclined surfaces T formed in the holes 31e and 31e when the short-circuit member formation groups 31 and 32 are superimposed. In the present embodiment, the height of each of the projections 32d and 32e is set greater than the plate thickness of the first short-circuit member formation group 31 (refer to FIG. 6A).

Figure 6A:
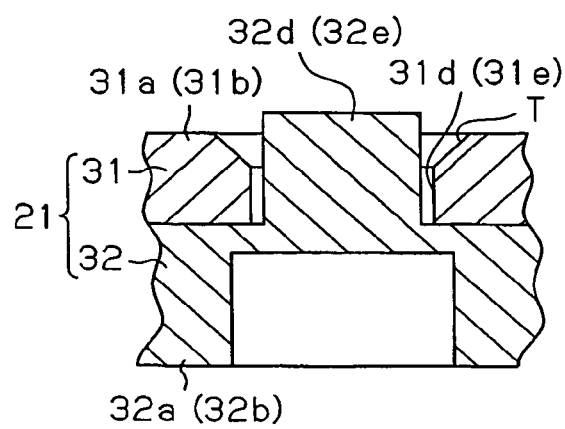
FIGS. 6A and 6B are partially enlarged cross-sectional views illustrating the method for manufacturing the armature of FIG. 1.
Figure 6B:
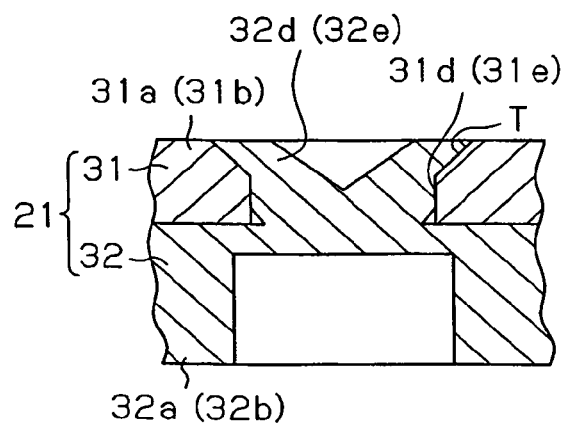

The short-circuit member formation groups 31 and 32 are superimposed in a manner that the projections 32d and 32e are inserted into and through the corresponding holes 31d and 31e and crimped so that the short-circuit member formation groups 31 and 32 are fixed to each other (refer to FIG. 6B). The crimping deforms the tips of the projections 32d and 32e and covers the openings (the inclined surfaces T) of the corresponding holes 31d and 31e. The crimping is performed in a manner that the crimped projections 32d and 32e cover the entire inclined surfaces T but do not project from the surface of the first short-circuit member formation group 31. The short-circuit member 12 with this structure electrically connects three outer terminals 31a (32a) arranged at 120-degree intervals and three inner terminals 31b (32b) arranged at 120-degree intervals.

In the short-circuit member formation groups 31 and 32, each pair of the overlapping outer terminals 31a and 32a and each pair of the overlapping inner terminals 31b and 32b are also welded together (spot-welded) (not shown). In detail, the surfaces of the short-circuit member formation groups 31 and 32 are tin-plated in advance. The above welding melts the tin plating between the outer terminals 31a and 32a or between the inner terminals 31b and 32b and bonds the outer terminals 31a and 32a and the inner terminals 31b and 32b together. This stabilizes and reduces the contact resistance of the outer terminals 31a and 32a and the inner terminals 31b and 32b.

The short-circuit insulator 22 is made of a thermoplastic resin and differs in material from the main body insulator 14, which is made of a thermosetting resin. The short-circuit insulator 22 is arranged between different parts of the short-circuit member formation groups 31 and 32 that form the short-circuit conductor 21 (the outer terminals 31a and 32a, the inner terminals 31b and 32b, and the linking portions 31c and 32c) to keep these parts spaced from one another. The short-circuit insulator 22 is also arranged at both sides of the short-circuit conductor 21 with respect to the axial direction to cover the short-circuit conductor 21 except for the outer terminals 31a and 32a.

As shown in FIG. 1, a boss 22a, which extends from the axial end portion of the commutator main body 11, is integrally formed with the short-circuit insulator 22. Further, the short-circuit insulator 22 has a large-diameter portion 22b at a basal end portion of the boss 22a. The large-diameter portion 22b projects downward in the axial direction from the axial end portion of the commutator main body 11 and has an outer diameter greater than the outer diameter of the boss 22a. The inner diameter of the tubular short-circuit insulator 22 is equal to the outer diameter of the cylindrical portion 14a of the main body insulator 14. The short-circuit insulator 22 enables the cylindrical portion 14a to be fitted therein. The short-circuit insulator 22 has a circular cross-section in a manner that its outer diameter changes smoothly from the large-diameter portion 22b to the boss 22a.

The short-circuit member 12 is arranged on the axial end portion of the commutator main body 11 to electrically connect its outer terminals 31a and 32a to the commutator pieces 13. In detail, axial end portions (lower ends in FIG. 1) of the commutator pieces 13 are formed to have recesses 13b (refer to FIG. 7A) corresponding to the outer terminals 31a and 32a. In a state in which the outer terminals 31a and 32a are arranged in the recesses 13b, the two side walls of the recesses 13b are crimped. The crimped walls are deformed to partially cover the outer terminals 31a and 32a. As a result, the short-circuit member 12 is fixed to the commutator main body 11 (refer to FIG. 7B).

Figure 7A:
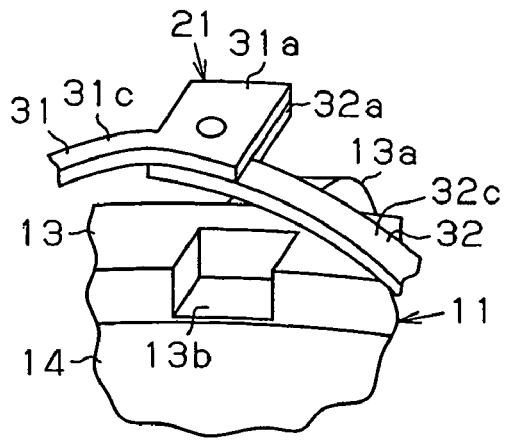
FIGS. 7A and 7B are partially enlarged cross-sectional views illustrating the method for manufacturing the armature of FIG. 1.
Figure 7B:
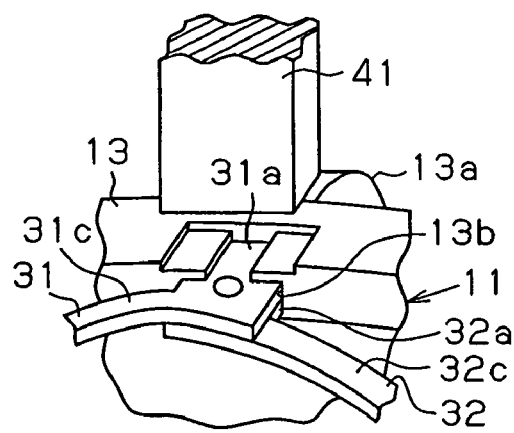

FIGS. 7A and 7B do not show the short-circuit insulator 22 of the short-circuit member 12 and schematically shows only the short-circuit conductor 21 of the short-circuit member 12. FIG. 7B additionally shows a jig or, punch 41, used for crimping. As shown in FIG. 1, the cylindrical portion 14a of the main body insulator 14 is fitted in the short-circuit insulator 22.

As shown in FIG. 1, the armature core 3 and the commutator 4 of the above-described structure are fixed arranged adjacent to each other in the axial direction with respect to the rotation shaft 2, which is inserted through the tubular portion 3a and the cylindrical portion 14a. Further, the commutator 4 comes in contact with the tubular portion 3a of the armature core 3 at the distal surface of the boss 22a. The boss 22a functions to guide and support a portion of each coil 5 that extends from a wire connection portion 13a of the commutator piece 13 to a predetermined tooth 3b located at a position separated from that wire connection portion 13a in the circumferential direction. Such a portion of the coil 5 is referred to as a crossover wire 5a. More specifically, the boss 22a guides the coil 5 to prevent the coil 5 from coming into direct contact with the rotation shaft 2, or to prevent each coil 5 from being abruptly bent with a sharp curvature.

The method for manufacturing the commutator 4 for the armature 1 with the above-described structure will now be described. First, a method for manufacturing the short-circuit member 12 will be described. The method for manufacturing the short-circuit member 12 includes a punching process, a superimposing process, an insulator filling process, and a removing process.

In the punching process, as shown in FIGS. 3 and 4, conductive plates 55 and 56 are punched out in a manner that the linking portions 31c and 32c in the short-circuit member formation groups 31 and 32 are formed spaced from one another in the circumferential direction, and inner linking portions 51 and 52 and outer linking portions 53 and 54 for annularly linking the linking portions 31c and 32c respectively at the inner side and the outer side in the radial direction are formed. In this state, the conductive plates 55 and 56 are punched out in a manner that the outer terminals 31a and 32a are formed spaced from one another in the circumferential direction, and the inner terminals 31b and 32b are formed spaced from one another in the circumferential direction. At the same time, the holes 31d and 31e and the projections 32d and 32e are formed. Further, at the same time, the linking portions 31c in the first short-circuit member formation group 31 are curved to project toward one side in the axial direction from the outer terminals 31a and the inner terminals 31b.

The conductive plates 55 and 56 are punched out from the side of the surfaces of the second short-circuit member formation groups 31 and 32 facing each other toward the opposite surfaces. More specifically, the conductive plate 55 corresponding to the first short-circuit member formation group 31 is punched out downward in FIG. 1. The conductive plate 56 corresponding to the second short-circuit member formation group 32 is punched out upward in FIG. 1. Further, the conductive plate 55, which corresponds to the first short-circuit member formation group 31, is thinner than the conductive plate 56, which corresponds to the second short-circuit member formation group 32, and is formed from a material having a smaller electrical resistivity than the conductive plate 56. More specifically, the conductive plate 55 is formed from a copper material, and the conductive plate 56 is formed from a brass material. The surfaces of the conductive plates 55 and 56 are tin-plated in advance.

Figure 5:
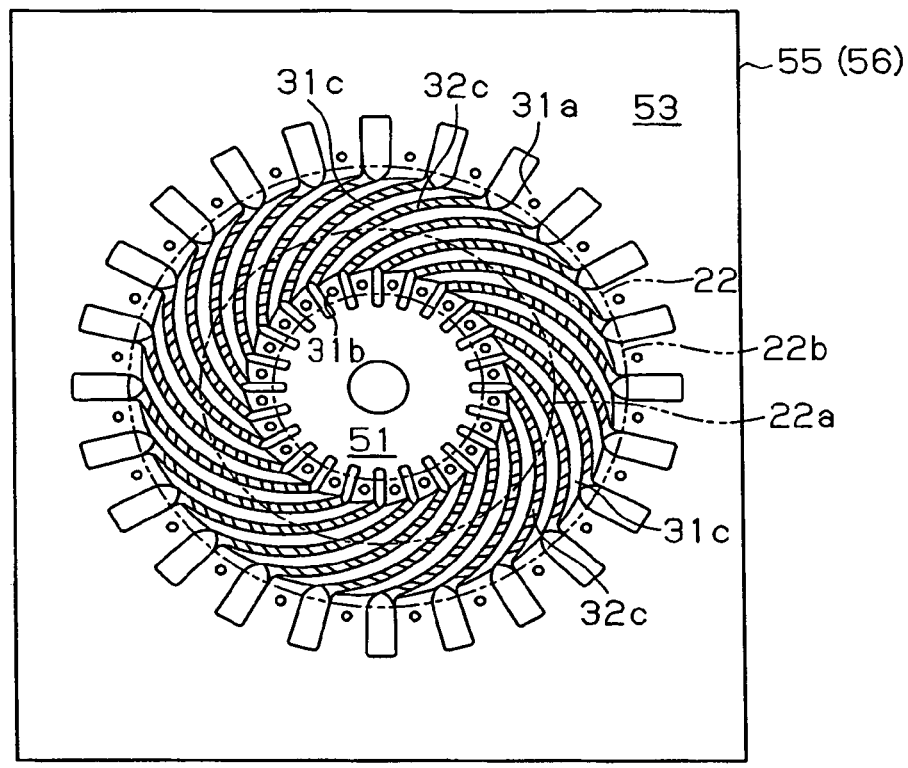
FIG. 5 is a plan view illustrating the method for manufacturing the armature of FIG. 1.

In the superimposing process, the two conductive plates 55 and 56 that have been punched out are superimposed as shown in FIG. 5. Here, the projections 32d and 32e are inserted through the holes 31d and 31e (refer to FIG. 6A) and crimped in this state. As a result, the tips of the projections 32d and 32e are deformed to cover the openings of the holes 31d and 31e and fix the two conductive plates 55 and 56 each other (refer to FIG. 6B).

After the crimping, the overlapping outer terminals 31a and 32a and the overlapping inner terminals 31b and 32b are further spot-welded. In detail, the tin plating between the outer terminals 31a and 32a and between the inner terminals 31b and 32b is melted to bond the terminals together.

In the insulator filling process, the short-circuit insulator 22 is formed in the conductive plates 55 and 56 as shown by double-dashed lines in FIG. 5. In detail, the superimposed conductive plates 55 and 56 are placed in a mold (not shown), and molten resin material is filled into the mold and solidified. As a result, resin flows into the space between parts of the conductive plates 55 and 56. This forms a resin portion including the short-circuit insulator 22.

The resin material used here is a thermosetting resin material. The molten resin material is first injected into spaces between the linking portions 31c and linking portions 32c facing one another. The resin material then flows toward other parts including a part corresponding to the boss 22a through gaps between the linking portions 31c and gaps between the linking portions 32c. This forms the resin portion including the short-circuit insulator 22. The mold used for forming the resin portion has a resin material injection inlet through which the molten resin material is first injected into the gaps between the linking portions 31c and the linking portions 32c.

In the removing process, the inner linking portions 51 and 52 and the outer linking portions 53 and 54 of the conductive plates 55 and 56 are punched out and removed. This completes the manufacture of the short-circuit member 12 shown in FIG. 2.

Next, in a commutator manufacturing process, the short-circuit member 12 is attached to an intermediate member, which becomes the commutator main body 11. In detail, in a process separate from the manufacturing processes of the short-circuit member 12, the intermediate member (not shown) is manufactured by molding the main body insulator 14 in a conductive tubular member (not shown), which includes the commutator pieces 13. More specifically, in a state in which the conductive tubular member is arranged in a mold (not shown), a molten resin material is filled into the mold and solidified. This forms a resin portion including the main body insulator 14 surrounded by the conductive tubular member. In a process described later, the conductive tubular member is divided to form the twenty-four commutator pieces 13. The resin material used for the molding is the thermosetting resin (phenol resin etc.) described above. The mold used for the molding has projections (not shown) for forming the recess 13b (refer to FIG. 7A). Thus, the recesses 13b are formed in the conductive tubular member with the mold that molds the resin portion (main body insulator 14) when the mold is clamped.

The short-circuit member 12 is fixed to the axial end portion of the intermediate member so that its outer terminals 31a and 32a are electrically connected to the conductive tubular member. In detail, in a state in which the outer terminals 31a and 32a are arranged in the recesses 13b, the short-circuit member 12 undergoes crimping. More specifically, in a state in which the outer terminals 31a and 32a are arranged in the recesses 13b, the two side walls of the recesses 13b are crimped by the jig (punch) 41. As a result, the crimped walls partially cover the outer terminals 31a and 32a (refer to FIG. 7B).

Next, the conductive tubular member is cut into a plurality of portions in the circumferential direction to form a plurality (twenty-four) of the commutator pieces 13. This completes the manufacture of the commutator 4. In this state, the wire connection portions 13a of the commutator 4 are not yet bent and the coils 5 are yet to be hooked to the wire connection portions 13a.

Next, in a provisional assembly process, the armature core 3 and the commutator 4 are assembled with the rotation shaft 2 by pressing the rotation shaft 2 into the armature core 3 and the commutator 4. In this state, to prevent the distal surface of the boss 22a from coming into contact with the tubular portion 3a of the armature core 3, a gap is formed between the boss 22a and the tubular portion 3a of the armature core 3 in the axial direction.

Next, in a coiling process, in a state in which the coils 5 are hooked on the wire connection portions 13a, the coils 5 are wound around predetermined teeth 3b of the armature core 3 by concentrated winding or distributed winding. In this state, the portion of each coil 5 extending from the corresponding wire connection portion 13a to the corresponding predetermined tooth 3b, that is, the crossover wire 5a, is entwined to and supported by the boss 22a. More specifically, the crossover wire 5a is guided free from direct contact with the rotation shaft 2 so that it is not abruptly bent at a sharp curvature in accordance with the diameter of the rotation shaft 2.

In a main assembly process, at least one of the armature core 3 and the commutator 4 is pressed and moved along the rotation shaft 2 in a manner that the distal surface of the boss 22a is pressed against the tubular portion 3a of the armature core 3 as shown in FIG. 1. This completes the manufacture of the armature 1.

The armature 1 with the above-described structure enables electric current to flow not only through the commutator pieces 13 that are in direct contact with the anode and cathode power feeding brushes but also through the commutator pieces 13 that are short-circuited with the commutator pieces 13 that are in contact with the brushes through the short-circuit conductor 21 of the short-circuit member 12. This structure reduces the number of the anode and cathode power feeding brushes required, and enables electric current to be simultaneously supplied to a larger number of coils 5.

The present embodiment has the advantages described below.

(1) The short-circuit conductor 21 is formed by superimposing the two short-circuit member formation groups 31 and 32, each of which is formed as a single layer. The short-circuit conductor 21 of the present embodiment electrically connects three outer terminals 31a (32a), which are arranged at 120-degree intervals, and connect the outer terminals 31a and 32a to the twenty-four commutator pieces 13. This short-circuits the commutator pieces 13 that are arranged at 120-degree intervals. More specifically, the short-circuit conductor 21 of the present embodiment has a smaller thickness (axial dimension) than the conventional short-circuit conductors. Such a thin short-circuit conductor 21 enables the commutator pieces 13 to be short-circuits. Further, the short-circuit member formation groups 31 and 32 are generally flat and may easily be formed by punching the conductive plates 55 and 56.

The first short-circuit member formation group 31 is thinner than the second short-circuit member formation group 32. In other words, the second short-circuit member formation group 32 is thicker than the first short-circuit member formation group 31 (refer to FIG. 6A). Thus, when the projections 32d and 32e of the second short-circuit member formation group 32 are formed through punching, the projections 32d and 32e are easily projected by a large amount. Further, because the first short-circuit member formation group 31 is thinner than the second short-circuit member formation group 32, the holes 31d and 31e of the first short-circuit member formation group 31 are formed with a relatively short length in the axial direction. This facilitates crimping when the projections 32d and 32e are inserted through the holes 31d and 31e. In detail, the structure in which the tips of the projections 32d and 32e are crimped to cover the openings of the holes 31d and 31e (refer to FIG. 6B) is easily obtained. As a result, the electrical and mechanical connection between the two short-circuit member formation groups 31 and 32 is strong and easily realized. Further, the linking portions 31c and 32c are spaced from each other in the superimposing direction and do not come in contact with each other. As a result, the linking portions 31c and 32c are prevented from rubbing against each other and are prevented from being electrically connected to each other (layer short). This improves the electrical reliability of the commutator.

(2) The first short-circuit member formation group 31 is thinner than the second short-circuit member formation group 32 but is formed from a copper material, which has a smaller electric resistivity than the brass material used for the second short-circuit member formation group 32. As a result, the short-circuit member formation groups 31 and 32 have substantially the same electric resistance. The second short-circuit member formation group 32, which is formed from a material having a greater electric resistivity than the material of the first short-circuit member formation group 31, may be formed from a low-cost material such as a brass material. This prevents a cost increase.

(3) The short-circuit conductor 21 excluding the outer terminals 31a and 32a is embedded in the short-circuit insulator 22. Thus, the linking portions 31c and 32c remain spaced away from each other. This prevents the linking portions 31c and 32c from rubbing against each other and prevents the short-circuit conductor 21 and the coils 5 from rubbing against each other. Thus, they are not electrically connected to each other (layer short).

(4) The main body insulator 14 of the commutator main body 11 and the short-circuit insulator 22 of the short-circuit member 12 are formed from different materials. More specifically, the main body insulator 14 is formed from a material having superior heat expansion and contraction characteristics and a high mechanical strength (a thermosetting resin, namely, a phenol resin in the present embodiment). This reduces displacement of the commutator pieces 13 in the radial direction. The short-circuit member 12 including the short-circuit insulator 22 is arranged on the axial end portion of the commutator main body 11. Thus, even though the short-circuit insulator 22 is formed from a material having relatively poor heat expansion and contraction characteristics and a relatively low mechanical strength (a thermoplastic resin in the present embodiment), the short-circuit insulator 22 does not greatly increase displacement of the commutator pieces 13 from one another in the radial direction. Thus, the short-circuit insulator 22 may be formed from a material having poor heat expansion and contraction characteristics and a low mechanical strength. In this case, the short-circuit member 12 is manufactured at a low cost and is easily recycled.

(5) The conical inclined surfaces T are formed at the openings of the holes 31d and 31e. Thus, the tips of the projections 32d and 32e, which are crimped, easily cover the openings of the holes 31d and 31e. More specifically, when the inclined surfaces T are not formed in the openings of the holes, the projections inserted through the holes need to be formed sufficiently larger than the plate thickness of the first short-circuit member formation group 31 to ensure that crimping is performed. However, such long projections are difficult to form by punching. Further, when the inclined surfaces T are not formed in the openings of the holes, parts of the crimped projections may protrude from the surface of the short-circuit member formation group. Such problem does not occur with the present embodiment since the inclined surfaces T are formed in the openings of the holes 31d and 31e.

(6) The length of the projections 32d and 32e is greater than the plate thickness of the first short-circuit member formation group 31. Thus, parts of the projections 32d and 32e that are crimped cover the entire inclined surfaces T. This increases the fixing strength of the short-circuit member formation groups 31 and 32.

The above embodiment may be modified in the following forms.

In the above embodiment, the commutator 4 includes the twenty-four commutator pieces 13, with three commutator pieces 13 arranged at 120-degree intervals short-circuited with one another. However, the number of the commutator pieces 13 included in the commutator 4 should not be limited to twenty-four, and the angular interval at which the short-circuited commutator pieces 13 are arranged is not limited to 120 degrees. For example, the commutator 4 may include sixteen commutator pieces 13, with two commutator pieces 13 arranged at 180-degree intervals short-circuited with each other. In this case, the structure of the short-circuit member 12 is modified accordingly.

In the above embodiment, the linking portions 31c in the first short-circuit member formation group 31 are curved in a direction in which the linking portions 31c are spaced from the linking portions 32c in the second short-circuit member formation group 32. However, this may be changed to other structures. It is only required that the linking portions 31c and 32c are prevented from coming into contact with each other.

Figure 8:
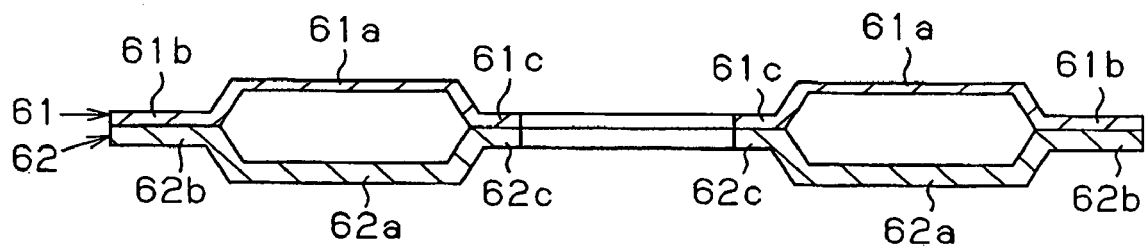
FIG. 8 is a cross-sectional view of a short-circuit member according to another example of the present invention.

For example, as shown in FIG. 8, linking portions 61a and 62a in two short-circuit member formation groups 61 and 62 may be bent with respect to outer terminals 61b and 62b and inner terminals 61c and 62c in a direction in which the linking portions 61a and 62a included in the two short-circuit member formation groups 61 and 62 are spaced from each other so that the linking portions 61a and 62a do not come in contact with each other in the superimposing direction of the short-circuit member formation groups 61 and 62.

Figure 9:
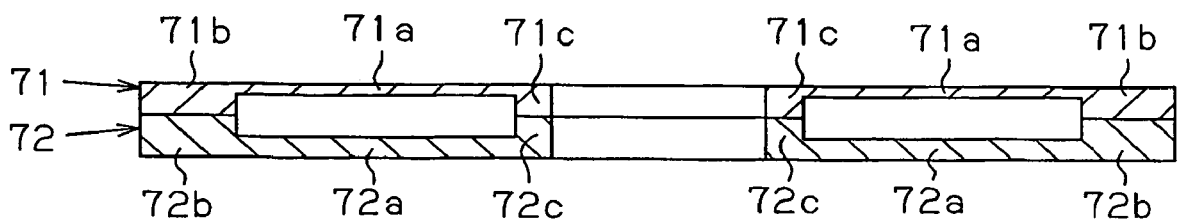
FIG. 9 is a cross-sectional view of a short-circuit member according to a further example of the present invention.

Further, as shown in FIG. 9, linking portions 71a and 72a in two short-circuit member formation groups 71 and 72 may be formed to be thinner than outer terminals 71b and 72b and inner terminals 71c and 72c. In this case, the linking portions 71a and 72a do not come in contact with each other in the superimposing direction of the short-circuit member formation groups 71 and 72.

Further, an insulator paper may be arranged between the linking portions in the two short-circuit member formation groups to prevent the linking portions from coming into contact with each other in the superimposing direction. Further, instead of the short-circuit insulator 22, such an insulator paper may be used to maintain the intervals between different parts of a short-circuit conductor.

In the above embodiment, the linking portions 31c and 32c in the short-circuit member formation groups 31 and 32 respectively link the outer terminals 31a and 32a and the inner terminals 31b and 32b that are arranged at positions separated from one another by the predetermined angle in the circumferential direction. However, it is only required that the linking portions in at least one of the short-circuit member formation groups link the outer terminals and the inner terminals that are arranged at positions separated from each other by the predetermined angle in the circumferential direction. That is, the linking portions in the other one of the short-circuit member formation groups may extend only in the radial direction to link the outer terminals and the inner terminals that are not separated in the circumferential direction.

In the above embodiment, each of the linking portions 31c and 32c extends along an involute curve. However, the curve along which each linking portion extends should not be limited to an involute curve. Further, the linking portions 31c and 32c may extend along a straight line inclined with respect to the radial direction.

In the above embodiment, the first short-circuit member formation group 31 is formed from a material having a smaller electric resistivity than the material used for the second short-circuit member formation group 32. The present invention should not be limited to this structure. The two short-circuit member formation groups 31 and 32 may be formed from the same material.

In the above embodiment, the two short-circuit member formation groups 31 and 32 are fixed through crimping and spot-welding. However, the present invention should not be limited to this structure. The welding need not be performed, or welding other than the spot welding may be performed. In the above embodiment, the short-circuit member formation groups 31 and 32 are bonded together by melting the tin plating applied in advance to the short-circuit member formation groups 31 and 32. However, the base materials of the short-circuit member formation groups 31 and 32 may be melted to bond the short-circuit member formation groups 31 and 32 together.

In the above embodiment, the main body insulator 14 of the commutator main body 11 and the short-circuit insulator 22 of the short-circuit member 12 are formed from different materials. However, the present invention should not be limited to this structure. The main body insulator and the short-circuit insulator may both be formed from a thermosetting resin (a phenol resin etc.).

In the above embodiment, the boss 22a is integrally formed with the short-circuit insulator 22. However, the present invention should not be limited to this structure. The boss 22a may be omitted from the short-circuit insulator 22. Further, in the above embodiment, the short-circuit insulator 22 has the large-diameter portion 22b. However, the large-diameter portion 22b may be omitted from the short-circuit insulator 22.

In the above embodiment, the boss 22a functions to position the commutator 4 with respect to the armature core 3 in the axial direction and also functions to guide the crossover wires 5a. However, the boss 22a does not have to have the two functions and may have only one of the functions.

In the above embodiment, the conical inclined surfaces T are formed at the holes 31d and 31e. However, the inclined surfaces T do not have to be formed.

The short-circuit member 12, the commutator 4, and the armature 1 in the above embodiment do not have to be manufactured using the manufacturing methods described above.

The invention claimed is:

1. A commutator comprising:
    a commutator main body including a cylindrical main body insulator and a plurality of commutator pieces held on an outer circumferential surface of the main body insulator so that the commutator pieces are arranged in a circumferential direction of the main body insulator; and
    a short-circuit member attached to the commutator main body and including a short-circuit conductor that short-circuits the commutator pieces;
    wherein the short-circuit conductor includes first and second short-circuit member formation groups arranged with one of said first and second short-circuit member formation groups superimposed over the other with respect to a direction of an axis of the commutator, with each of the short-circuit member formation groups having a plurality of outer terminals arranged about the axis of the commutator, a plurality of inner terminals arranged about the axis of the commutator radially inward from the outer terminals, and a plurality of linking portions linking each of the outer terminals to one of the inner terminals, wherein the linking portions in at least one of the first and second short-circuit member formation groups links the outer terminals and the inner terminals that are separated from each other by a predetermined angle in the circumferential direction;
    wherein each of the outer terminals in the first short-circuit member formation group contacts one of the outer terminals in the second short-circuit member formation group, each of the inner terminals in the first short-circuit member formation group contacts one of the inner terminals in the second short-circuit member formation group, and the linking portions in the first short-circuit member formation group are maintained in non-contact with the linking portions in the second short-circuit member formation group; and
    wherein the first short-circuit member formation group is thinner than the second short-circuit member formation group with respect to the direction of the axis of the commutator, the second short-circuit member formation group has a plurality of projections formed through punching, the first short-circuit member formation group has a plurality of holes respectively corresponding to the projections, and the first short-circuit member formation group and the second short-circuit member formation group are fixed to each other by crimping the projections in a state inserted through the corresponding holes.

2. The commutator according to claim 1, wherein the first short-circuit member formation group is formed from a material having a smaller electric resistivity than the second short-circuit member formation group.

3. The commutator according to claim 2, wherein the first short-circuit member formation group is formed from a copper material, and the second short-circuit member formation group is formed from a brass material.

4. The commutator according to claim 1, wherein the short-circuit member includes a short-circuit insulator for holding the short-circuit conductor in a state embedded in the short-circuit insulator.

5. The commutator according to claim 4, wherein the main body insulator and the short-circuit insulator are formed from different materials.

6. The commutator according to claim 5, wherein the main body insulator is formed from a thermosetting resin, and the short-circuit insulator is formed from a thermoplastic resin.

7. The commutator according to claim 1, wherein the holes have openings opposite the second short-circuit member formation group and include conical inclined surfaces having a diameter that is outwardly enlarged.

8. The commutator according to claim 7, wherein the projections are punched out to have a length greater than a plate thickness of the first short-circuit member formation group.

9. The commutator according to claim 1, wherein the projections are formed on the outer terminals and the inner terminals in the second short-circuit member formation group, and the holes are formed in the outer terminals and the inner terminals in the first short-circuit member formation group.

10. The commutator according to claim 1, wherein at least either one of the linking portions in the first short-circuit member formation group and the linking portions in the second short-circuit member formation group are curved or bent to be spaced from the other one of the linking portions in the first short-circuit member formation group and the linking portions in the second short-circuit member formation group in a superimposing direction of the two short-circuit member formation groups.

11. The commutator according to claim 1, wherein the linking portions are thinner than the outer terminals and the inner terminals in at least one of the first short-circuit member formation group and the second short-circuit member formation group.

12. The commutator according to claim 1, wherein the short-circuit member is arranged at one axial end of the commutator main body.

13. An armature comprising:
the commutator according to claim 1;
a rotation shaft extending through the axis of the commutator;
an armature core fixed to the rotation shaft so as to be axially aligned with the commutator, wherein the armature core has a plurality of teeth; and
a plurality of coils wound around the teeth.

* * * * *